United States Patent
Joshi et al.

(10) Patent No.: US 11,888,901 B2
(45) Date of Patent: Jan. 30, 2024

(54) ENABLING RESTRICTION ON TRANSMISSION OF DATA PACKETS AT INGRESS NETWORK DEVICE

(71) Applicant: HEWLETT PACKARD ENTERPRISE DEVELOPMENT LP, Houston, TX (US)

(72) Inventors: Vinayak Joshi, Bangalore (IN); Venkatavaradhan Devarajan, Bangalore (IN); Rajib Majila, Bangalore (IN); Tathagata Nandy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 324 days.

(21) Appl. No.: 17/409,179

(22) Filed: Aug. 23, 2021

(65) Prior Publication Data
US 2022/0417287 A1    Dec. 29, 2022

(30) Foreign Application Priority Data
Jun. 23, 2021   (IN) .............................. 202141028153

(51) Int. Cl.
*H04L 9/40*    (2022.01)
*H04L 9/32*    (2006.01)

(52) U.S. Cl.
CPC .......... *H04L 63/20* (2013.01); *H04L 63/0236* (2013.01); *H04L 63/105* (2013.01)

(58) Field of Classification Search
CPC .... H04L 63/20; H04L 63/0236; H04L 63/105
USPC .......................................................... 726/1
See application file for complete search history.

(56) References Cited

U.S. PATENT DOCUMENTS

| 7,299,296 | B1* | 11/2007 | Lo .......................... H04L 12/66 370/231 |
| 7,827,402 | B2 | 11/2010 | Smith |
| 9,380,025 | B2 | 6/2016 | Nellikar et al. |
| 9,407,604 | B2 | 8/2016 | Smith |
| 2005/0157647 | A1* | 7/2005 | Sterne ................. H04L 63/0227 370/235 |

(Continued)

OTHER PUBLICATIONS

Ferguson P. et al., "Network Ingress Filtering: Defeating Denial of Service Attacks Which Employ IP Source Address Spoofing," May 2000, https://tools.ietf.org/html/rfc2827.

*Primary Examiner* — Michael S McNally
(74) *Attorney, Agent, or Firm* — Hewlett Packard Enterprise Patent Department

(57) ABSTRACT

Examples disclosed herein relate to a method for defining an ingress access policy at an ingress network device based on instructions from an egress network device. The egress network device receives data packets directed to a first entity from a second entity connected to an ingress network device. Each data packet transmitted includes a source role tag corresponding to the second entity. At the egress network device, the data packets may be dropped based on the enforcement of an egress access policy. When the number of data packets that are being dropped increases beyond a pre-defined threshold, the egress network device transmits a command to the ingress network device instructing the ingress network device to create a restriction on the transmission of subsequent data packets. The command is transmitted in a Border Gateway Protocol (BGP) Flow Specification (FlowSpec) route.

20 Claims, 9 Drawing Sheets

(56) References Cited

U.S. PATENT DOCUMENTS

2014/0237118 A1* 8/2014 Matthews ............... H04L 47/32
709/226
2018/0191679 A1* 7/2018 Mulka .................... H04L 45/38
2020/0389487 A1 12/2020 Zhauniarovich et al.

* cited by examiner

ENABLING RESTRICTION ON TRANSMISSION OF DATA PACKETS AT INGRESS NETWORK DEVICE

BACKGROUND

In distributed networks, controlling access rights of users or devices to resources of an enterprise or an organisation may be useful for maintaining the security needs of the distributed networks. The access rights assigned to a user define how the user may access data available in the distributed network or how the user may communicate within the organization's resources. Further, the access rights may be controlled by a security device that is integrated with the distributed network and provides privileges to the user based on the role of the user.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

Figure 1:
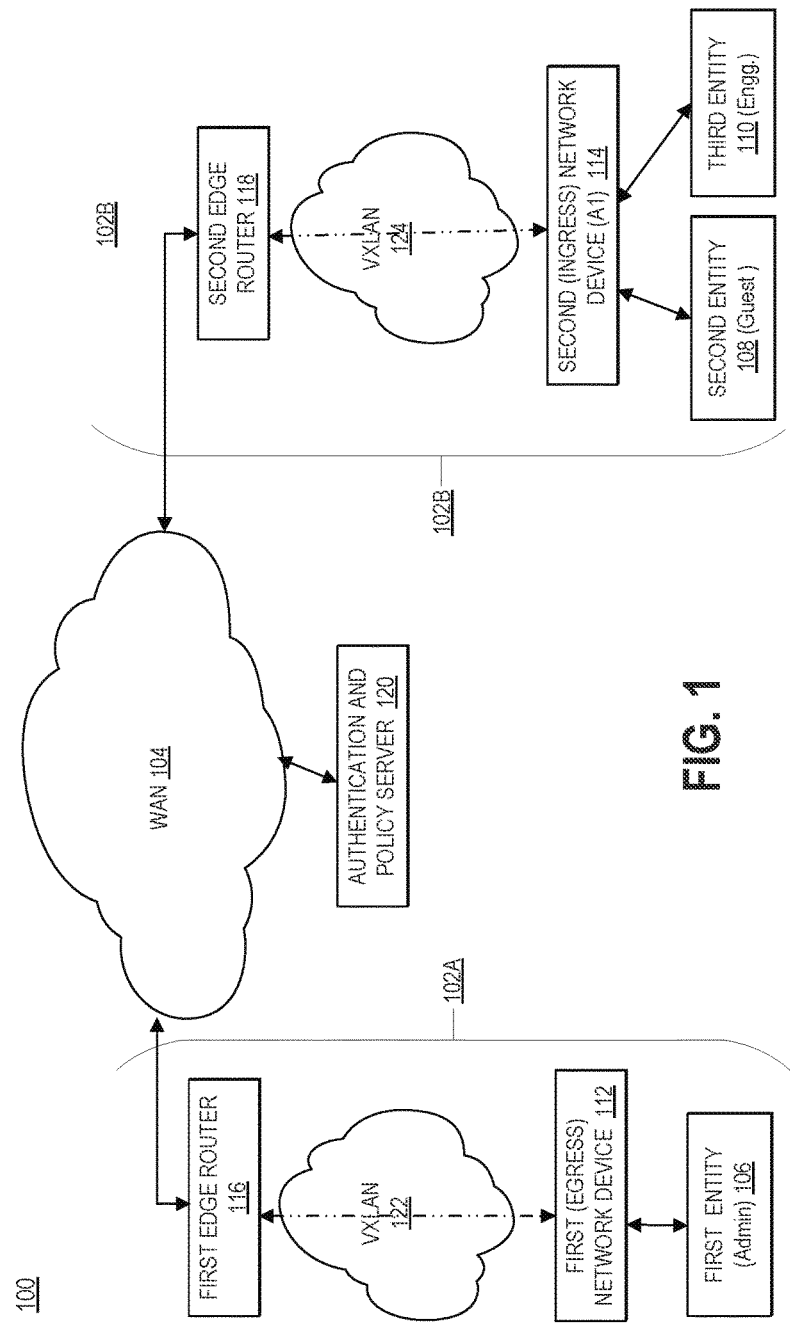
FIG. 1 is a network environment in which an ingress access policy may be defined, in accordance with an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, the use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used herein, the term "entity" may refer to a user, a host, a client device or a server transmitting or receiving data via network devices. The term "entity" is hereinafter interchangeably used as "client device" or "host". Each client device in a network may be assigned to a "Security Group Tag" (SGT) or "Source Group Tag" (SGT) based on the roles of the user within an organization. The term "network device" refers to network equipment (i.e., hardware) that connects a client device to a network and is used for enabling communication and interaction between hardware devices on the network. The term "source role tag" is indicative of the role of a source client device transmitting data packets. The term "destination role tag" is indicative of the role of a destination client device receiving the data packets from the source client device. Furthermore, the term "data packet" as used herein may refer to any unit of data that can be conveyed over a network. Moreover, the term "ingress network device" as used herein may refer to a network device that receives data packets from a connected source client device and forwards the data packets to the destination client device. The term "egress network device" as used herein may refer to a network device that forwards the received data packets to the connected destination client device via a network interface.

In distributed networks, network policies are applied to connected client devices associated with users who are on a single Internet Protocol (IP) subnet. The application of common network policies for all client devices in the IP subnet is based on an assumption that users connected to the IP subnet may have a similar role and can be grouped. For example, all the users of an engineering department present in the same geographic region may be grouped to be part of a common IP subnet. The client devices in a common IP subnet may be subjected to the same network policy based on a common role of the users. However, in reality, the users may move around in the distributed network, resulting in users from different departments on the common IP subnet. The common IP subnet may no longer support the same network policy as the users from different departments may have assigned roles that may be different from the role used for grouping users in the common IP subnet. Accordingly, in some cases, the application of network policy per IP subnet may not allow the users of the distributed network to access the network from other IP subnets. As there are no additional fields in the IP headers, conventional distributed networks may restrict the application of the network policy to IP addresses. An IP address generally includes subnets, Service Set Identifiers (SSIDs), and Access Control Lists (ACLS) needed to implement policy. As such, there may be no additional space or field to define other parameters such as user identity, location, and group information in the IP address.

In some cases, to decouple the network policy from IP addresses or IP subnets, similar users and devices may be grouped based on their authentication or device profiles. In the distributed network, once a client device is authenticated to the distributed network, a security server or authentication server may assign them to an SGT based on access credentials. Data packets generated by a source client device for a destination client device on the distributed network may be encapsulated with the SGT and transported over the distributed network. The data packets are received at an ingress network device from the source client device. The ingress network device may propagate the data packets via additional network devices to reach an egress network device over the distributed network. When the data packets reach the egress network device connected to the destination client device, the egress network device may enforce the network policy based on a match between the SGT of the source IP address and the SGT of the destination IP address. As such, such network policy is an end-to-end user or group policy that may be enforced at the egress network devices of the distributed network. When the network policy restricts communication between the SGT of the source IP address and the SGT of the destination IP address, the egress network device drops the data packets associated with the source IP address.

The transmission of data packets that get dropped at the egress network device utilizes computing resources at the additional network devices and consumes data bandwidth. When the number of data packets being dropped at egress network devices increases, the network may experience bandwidth issues. In distributed networks, where bandwidth usage costs are high, the transmission of the data packets that are eventually dropped may be considered as an additional bandwidth cost.

To prevent the transmission of data packets that are being dropped, the enforcement of an ingress access policy at the ingress network devices may be useful. However, an ingress network device receiving data packets associated with the source client device and directed towards the destination client device may not be aware of the role associated with the destination client device to enforce the ingress access policy at the ingress network device. To keep all the network devices aware of the roles of the connected client devices, the roles associated with client devices may be exchanged with all the network devices in the distributed network. However, keeping the copies of the roles associated with client devices at all the network devices increases the hardware requirement of the network devices. Additionally, increasing the hardware required for all the network devices may have a cost impact and may not be a practical solution.

The examples disclosed herein use the dropping of the data packets at the egress network device to define an ingress access policy at an ingress network device. The egress network device may receive data packets from a source client device associated with a source role tag (for e.g., "guest" role) for a destination client device associated with a destination role tag (for e.g., "administrator" role) connected to the egress network device. The egress network device may enforce an egress access policy and drop the data packets. The egress network device may transmit a command to network devices that have client devices with the same source role tag (i.e., the "guest role") to implement an ingress access policy based on a match between the source role tag and the destination role tag. The network devices (including the network device connected to the source client device) may enforce the ingress access policy to restrict subsequent data packets from being transmitted from the client devices (with the guest role) over the network to the destination client device connected to the egress network device. The command is not transmitted to all the network devices as data packets may not be transmitted by client devices connected to the network devices towards the client device connected to the egress network device.

Accordingly, various examples disclosed herein relate to a method for defining and enforcing an ingress access policy at selected ingress network devices. For example, the selected ingress devices may be network devices that have entities with the source role tag of the second entity. The selected network devices are chosen based on the role of the entities connected to the other network devices.

In some examples, a first network device that enforces an egress access policy may generate a command for a second network device. On receiving the command, the second network device may enforce the ingress access policy based on instructions received from the first network device in the command.

The first network device generates the instructions based on the processing of data packets. The first network device may receive data packets directed towards a first entity from a second entity. The second entity is connected to the second network device. Each data packet transmitted by the second entity may include a source role tag corresponding to the second entity. At the first network device, the data packets received from the second entity may be dropped based on the enforcement of the egress access policy.

In some examples, if the number of data packets that are being dropped increases beyond a pre-defined threshold, the first network device may transmit a command to the second network device. The command instructs the second network device to create a restriction on the transmission of subsequent data packets originating from the second entity that is directed towards the first entity.

Further, in some examples, at the second network device, the ingress access policy may be enforced based on a rule present in the command. The ingress access policy may define the restriction on the transmission of the subsequent data packet originating from the second entity that is directed towards the first entity by programming an Access Control List (ACL) based on the rule. Additionally, in some examples, the command may be transmitted to other network devices in the network that has at least one entity with the source role tag of the second entity.

As will be appreciated, defining an access policy for the ingress network device prevents unnecessary transmission of data packets to the egress network device. The restriction of transmission of subsequent data packets reduces the bandwidth consumption of the network as the data packets that are being dropped at the egress network device may no longer be transmitted by the ingress network device. Further, the transmission of the command to certain selected network devices instead of all the network devices in the network reduces the overall signaling overhead required for transmission of the command.

In the case of multicast data packets, a source client device acting as a multicast source may transmit multicast data packets (e.g., a multicast stream) to interested receivers (i.e., destination client devices). The interested receivers may join a multicast group using a Protocol Independent Multicast (PIM) message for receiving the multicast stream from the multicast source. A multicast distribution tree may be established for transmission of the multicast data packets from the multicast source to the receivers based on PIM join messages from the receivers. The multicast source is not aware of the role of the receivers. Similarly, the receivers may not be aware of the role of the multicast source transmitting the multicast stream. When the multicast data packets reach an egress network device connected to a receiver, the multicast data packets may be dropped based on an access policy. The dropping of the multicast data packets results in the usage of computing resources at network devices forwarding the multicast data packets. Additionally, considering the high cost of data transmission in distributed networks, the transmission of multicast data packets that are dropped may result in additional bandwidth consumption.

To prevent this additional bandwidth consumption and resource usage, the egress network device may delete a path between the egress network device and a network device forwarding the multicast data packets to the egress network device. A sub-tree on a branch of the multicast distribution tree that is forwarding the multicast data packets (i.e., multicast traffic) from the network device to the egress network device is deleted. The egress network device may transmit a PIM leave message to delete the traffic forwarding path to the egress network device. The deletion of the forwarding path may be referred to as pruning of the sub-tree in the multicast distribution tree. The egress network device prunes the path between the egress network device and an upstream device (i.e., the network device) by transmitting the PIM leave message to the upstream network device. The pruning of the path forwarding of multicast traffic to the egress network device reduces the resource consumption at network devices forwarding the multicast data packets.

Referring now to the drawings, FIG. 1 illustrates a network environment 100 in which an ingress access policy may be defined, in accordance with an example. The network environment 100 may represent a distributed network in which a pair of geographically separated sites, for example, sites 102A and 102B, may communicate with each other over a network. In the example of FIG. 1, the network is represented as a Wide Area Network (WAN) 104. The sites 102A and 102B may represent Local Area Networks (LANs) connected via the WAN 104. Examples of the WAN 104 may include one or more of Internet transport networks (e.g., Digital Subscriber Line (DSL), cable, etc.), Multiprotocol Label Switching (MPLS) networks (or other private packet-switched networks (e.g., Metro Ethernet, Frame Relay, Asynchronous Transfer Mode (ATM), etc.), Long Term Evolution (LTE) network or other mobile networks (e.g., 3G, 4G, 5G, etc.), or other WAN technologies (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched networks; small aperture terminal (VSAT) or other satellite networks; etc.).

The sites 102A and 102B may represent one or more campus networks, branch offices, or home offices. In some examples, each of the sites 102A and 102B may include multiple entities (sometimes also referred to as hosts, or clients, or client devices) connected to network devices. For example, the first site 102A may include a first network device 112, a first edge router 116, and a first entity 106. Further, in some examples, the second site 102B may include a second network device 114, a second edge router 118, and a second entity 108, and a third entity 110. The first entity 106 may be connected to the first network device 112, and the second entity 108, and the third entity 110 may be connected to the second network device 114. The first entity 106, the second entity 108, and the third entity 110 are hereinafter collectively referred to as connected entities 106-100 or client devices 106-110. Examples of the connected entities 106-110 may include, but are not limited to, general-purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and Internet of Things (IoT) devices. Further, the first network device 112 and the second network device 114 may include physical or virtual access switches, routers, and other network devices. The first network device 112 and second network device 114 may be access switches (wired) or access points (wireless) connecting the first entity 106, the second entity 108, or the third entity 110 to the WAN 104.

In the network environment 100 shown in FIG. 1, ingress network device (i.e., the first network device 112) and egress network device (i.e., the second network 114) may be located at different locations and the data packets between them may propagate via multiple network devices over the network (e.g., WAN 104). The ingress network device may refer to a network device that receives data packets from a connected entity (e.g., a source client device) and transmits the data packets towards a destination IP address via the WAN 104. The egress network device may refer to a network device that forwards the data packets to a connected entity (i.e., a destination client device) receiving the data packets from the WAN 104. For example, if the second entity 108 transmits data packets to the first entity 106 over the WAN 104, the second network device 114 may be referred to as the ingress network device present at site 102B. The data packets may be forwarded over the WAN 104 to the first network device 112 responsible for forwarding the data packets to the first entity 106. In such a case, the first network device 112 may be referred to as the egress network device present at site 102B.

Although the sites 102A and 102B presented in FIG. 1 shows one network device (e.g., the first network device 112 or the second network device 114) at each of the sites 102A and 102B, and three connected entities 106-110 for illustration purposes, it should be not understood as limiting. Use of any number of network devices and the connected entities is envisioned within the purview of the present disclosure.

The first edge router 116 and the second edge router 118 may operate as network entry points of the sites 102A and 102B, respectively, and provide secure data plane connectivity between the sites 102A and 102B over the WAN 104. Examples of the first edge router 116 and the second edge router 118 may include, but are not limited to, physical or virtual switches, routers, and other network devices. In some examples, the first edge router 116 and the second edge router 118 may be high-capacity switches that serve as a network gateway to the WAN 104 or the Internet.

In some examples, data packets transmitted by the network devices 112, 114 may include role information of one or more of the connected entities 106-110. To transmit role information of one or more of the connected entities 106-110 along with additional parameters in IP headers, encapsulation of data packets may be provided at the sites 102A and 102B using Virtual Extensible Local Area Network VXLAN-Group Policy Option (GPO), in some examples. The VXLAN refers to a technique for providing a Layer 2 ("L2") overlay on a Layer 3 ("L3") network. In particular, the VXLAN overlay may be used to address the need for overlay networks within virtualized data centers accommodating multiple tenants. In such overlay networks, native frames may be encapsulated with an outer IP overlay encapsulation, along with a VXLAN header and User Datagram Protocol (UDP) header. The GPO refers to an end-to-end policy user policy or group policy that can be enforced by the VXLAN. In an example, the VXLAN header may carry an SGT associated with a user role in data packets. In some examples, to facilitate the encapsulation of the native frames, the first network device 112 may connect the first entity 106 to the first edge router 116 using a VXLAN overlay 122. Similarly, the second network device 114 may connect the second entity 108 and the third entity 110 to the second edge router 118 using a VXLAN overlay 124.

Figure 3:
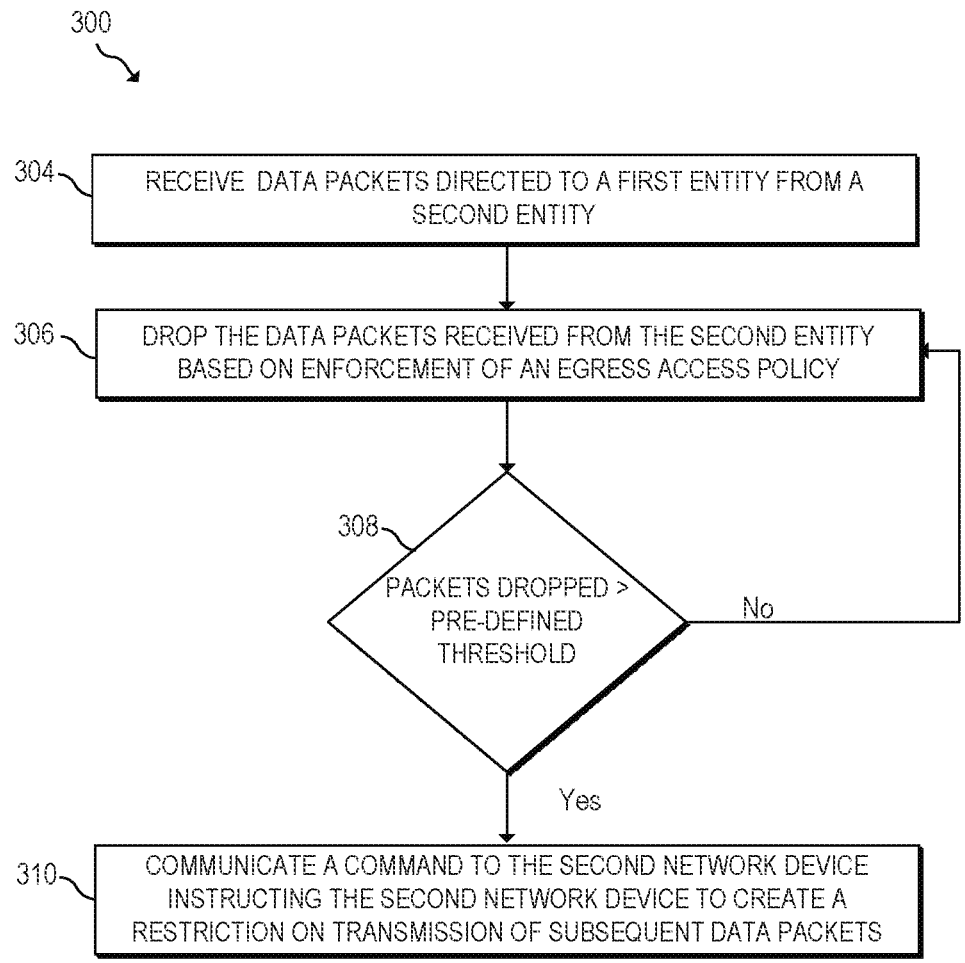
FIG. 3 is a flow diagram of a method for processing data packets received at an egress network device, in accordance with an example.

Although the example shown in FIG. 1 depicts VXLAN-GPO based encapsulation, the use of other encapsulation techniques is also envisioned within the scope of the present disclosure. The network connectivity and separation between the network devices and edge routers may be provided with the VXLAN overlay (shown as 122 and 124) together with (Border Gateway Protocol) BGP as the routing protocol. In some examples, the network devices (112 and 114) and the edge routers (116 and 118) may be BGP speakers that may communicate and exchange routing data. The BGP speakers may exchange routing information with each other. In some examples, the BGP speakers may advertise routes to other BGP speakers. FIG. 3 describes the routes advertised by the BGP speaker in detail.

An authentication and policy server 120 may classify or group the connected entities 106-110 according to the roles of the users of the connected entities 106-110. The first entity 106, the second entity 108, and the third entity 110 may be grouped into respective SGT based on the role associated with the users of the first entity 106, the second entity 108, and the third entity 110. The roles of the users may define what type of traffic a connected entity of the connected entities 106-110 may be able to send/receive as well as what other devices/users/roles that traffic may be sent to.

In some instances, two entities connected to the same network device may be associated with different roles based on credentials of the connected entities or of the respective users. The credentials may be an identity credential of the entity or a user credential received during authentication of the entity to the WAN 104. Network policies may be applied by the authentication and policy server 120 based on the identity credentials of the entity or the user credentials. For example, the user of the first entity 106 may be an administrator, and hence, the first entity 106 may be associated with an administrator role. Further, the user of the second entity 108 may be a guest user, and hence, the second entity 108 may be associated with a guest role. Also, in some examples, the user of the third entity 110 may be associated with an Engineering role.

The second network device 114 may receive an SGT corresponding to the second entity 108 from the authentication and policy server 120 on receiving data packets from the second entity 108. The second network device 114 may utilize the VXLAN-GPO encapsulation (shown as VXLAN overlay 122) for encapsulating the data packets with the source role tag of the first entity 106. The source role tag may be present in the VXLAN header. For example, data packets transmitted from the second entity 108 may be encapsulated by the second network device 114 with a source role tag as "guest" in the VXLAN packet header. The encapsulated data packets may be transmitted via the second edge router 118 and the first edge router 116 to the first network device 112. The first network device 112 may de-capsulate the data packets and may determine, from the VXLAN header, the source role tag of the second entity 108. Further, the first network device 112 may determine a destination role tag of the first entity 106 based on a destination IP address or the Media Access Control (MAC) address present in the VXLAN header.

The network policies defined at the authentication and policy server 120 may be implemented as access policies at the egress network devices in the WAN 104 based on the role of the user. The access policies implemented at the egress network devices (e.g., the first network device 112) may be referred to as an egress access policy. The egress network device may enforce an egress access policy based on a match between the source role tag and destination role tag. The egress access policy is an end-to-end user or group policy that is enforced at the egress network device. The egress access policy may include one or more rules that determine the action to be performed by the egress network device while enforcing the egress access policy. In one example, the egress access policy may include a rule that requires that any data traffic that is received from a connected entity associated with a guest role and directed towards a connected entity associated with an administrator role be dropped. Accordingly, in some examples, when the egress access policy is enforced at the first network device 112, data packets originating from the second entity 108 associated with the guest role may be forbidden from communicating with a first entity 106 associated with the administrator role. As the source role tag of the second entity 108 is guest, and the destination role tag of the first entity 106 is administrator, data packets received from the second entity 108 and directed towards the first entity 106 are dropped by the first network device 112.

The enforcement of the egress access policy at the first network device 112 after receiving the data packets may lead to WAN bandwidth issues and unnecessary processing of the data packets at network devices forwarding the data packets. To prevent the WAN bandwidth issues and processing of the data packets which eventually get dropped, the first network device 112, in accordance with the aspects of the present disclosure, may transmit a command to the second network device 114 instructing the second network device 114 to define restrictions for transmission of subsequent data packets directed towards the first entity 106 from the second entity 108. In some examples, the first network device 112 may transmit the command to the second network device 114 after a certain number of data packets are dropped. The first network device 112 may use a pre-defined threshold to determine when the command to restrict the transmission of subsequent data packets is to be sent. Additional details of the operations performed by the first network device 112 are described in conjunction with the FIG. 3.

In an example, the first network device 112 and second network device may be BGP speakers and the first network device 112 may send the command as a BGP Flow specification (FlowSpec) route to the second network device 114 using which the ingress access policy may be defined at the second network device 114. The BGP FlowSpec route allows the first network device 112 to advertise network policy associated with the first entity 106 to other network devices in the WAN 104.

Additionally, in some examples, the command may be transmitted to other network devices in the WAN 104. The other network device to which the command is transmitted is selected based on the role of the entities associated with a specific SGT. For example, the BGP FlowSpec route from the first network device 112 may be transmitted to selected network devices that have connected entities that are associated with a guest role. The transmission of the command to selected network devices instead of all the network devices in the WAN 104 reduces the overall signaling overhead required for transmission of the command. Additionally, the command may only be transmitted when the number of data packets being dropped is greater than the pre-defined threshold. Additional details with respect to the transmission of the command to selected network devices and processing of the command at the other network devices are described in FIG. 6.

Figure 2:
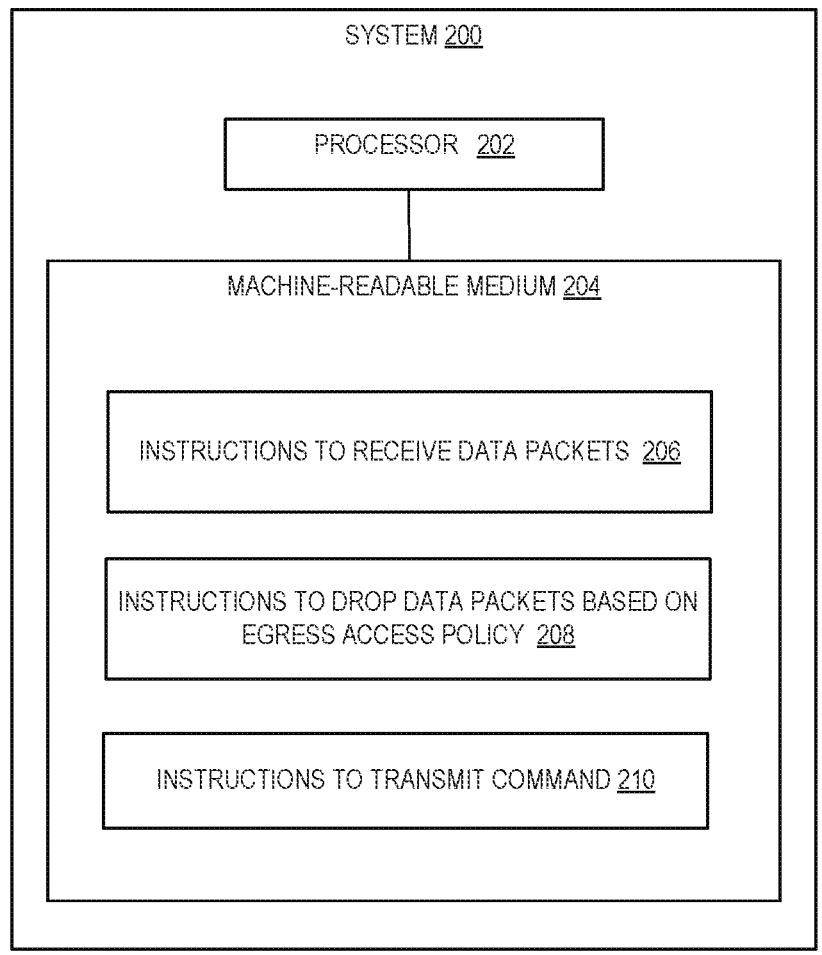
FIG. 2 illustrates a system for processing data packets at an egress network device, in accordance with an example.

Turning now to FIG. 2, a system 200 for processing data packets at an egress network device (i.e., the first network device 112) is presented, in accordance with an example. In an example, the system 200 shown may be an egress network device. In an example, the system 200 may be representative of the first network device 112 described in FIG. 1. The system 200 may include a processor 202 and a machine-readable medium 204 coupled to the processor 202. The machine-readable medium 204 may store instructions executable by the processor 202. The processor 202 may be implemented as microprocessors, microcomputers, microcontrollers, digital signal processors, central processing units, state machines, logic circuitries, and any devices that manipulate signals based on operational instructions. Among other capabilities, the processor 202 may be configured to fetch and execute instructions 206, 208, 210 stored in the machine-readable medium 204. The instructions, being executable by the processor 202, may also be referred to as processor-executable instructions.

In some examples, the functions of the various elements shown in FIG. 2, including any functional blocks labeled as "processor" may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application-specific integrated circuit (ASIC), field-programmable gate array (FPGA), read-only memory (ROM) for storing software, random access memory (RAM), non-volatile storage.

The machine-readable medium 204 may include any machine-readable medium known in the art including, for example, volatile memory (e.g., RAM), and/or non-volatile memory (e.g., EPROM, flash memory, etc.). As described in detail herein, the machine-readable medium 204 may be encoded with executable instructions 206, 208, and 210 for processing data packets at the egress network device and communicating a command to restrict the transmission of subsequent data packets.

For example, instruction 206 when executed by the processor 202 may cause the system 200 to receive the data packets directed to a first entity from a second entity. The first entity and the second entity described in FIG. 2 may be similar to the first entity 106 and the second entity 108 described above in reference to FIG. 1. Each data packet transmitted by the second entity may include the source role tag associated with a role of a user of the second entity. Further, instruction 208, when executed by the processor 202 may cause causes the system 200 to drop the received data packets.

The system 200 may drop the data packets based on enforcement of an egress access policy between the source role tag of a sender device and the destination role tag of a destination device. The sender device is the second entity that is transmitting data packets towards the first entity via an ingress network device. The destination device is the first entity that is receiving the data packets via an egress network device. The ingress network device and the egress network device may be similar to the second network device 114 and the first network device 112 as described in FIG. 1. The egress network device may drop the data packets received for the first entity from the second entity based on enforcement of an egress access policy between the source role tag corresponding to the second entity and a destination role tag corresponding to the first entity.

Furthermore, in some examples, the instruction 210, when executed by the processor 202 may cause the system 200 to transmit a command to the ingress network device to create a restriction on the transmission of subsequent data packets when the number of the data packets that are dropped is greater than the pre-defined threshold. For example, the egress network device may transmit the command to the ingress network device instructing the ingress network device to create a restriction on the transmission of subsequent data packets originating from the second entity that is directed towards the first entity. The command may be transmitted in a BGP FlowSpec route. In some examples, additional instructions executed by the processor 202 may cause the system 200 to withdraw the transmitted BGP FlowSpec route when there is a change in access policy between the source role tag and the destination role tag.

The operations performed at an egress network device to generate the command to be transmitted is described in FIG. 3. In particular, FIG. 3 depicts a flow diagram of a method 300 for processing data packets received at the egress network device, in accordance with an example. In some implementations, method 300 may include more or fewer blocks than are shown. In some implementations, one or more of the blocks of the method 300 may, at certain times, be ongoing and/or may repeat. In some implementations, blocks of the method 300 may be combined. The method 300 may be implemented in the form of executable instructions stored on a machine-readable medium (e.g., the machine-readable medium 204) and executed by processing resource (e.g., the processor 202) and/or in the form of electronic circuitry at a first network device. For illustration purposes, the method 300 is described in conjunction with FIG. 1. The first network device may be similar to the first network device 112 as described in FIG. 1.

At block 304, the first network device may receive data packets directed to the first entity from the second entity. The first entity and the second entity may be similar to the first entity 106 and the second entity 108 described above in reference to FIG. 1. In some examples, each data packet received at a first network device may be tagged with a source role tag corresponding to a role of the connected entity transmitting the data packet. In one example, the data packet received from the second entity may be tagged with the source role tag "guest."

At block 306, the first network device may drop the received data packets based on enforcement of an egress access policy between the source role tag associated with the second entity and a destination role tag associated with the first entity. In particular, at the first network device, the source role of the second entity may be identified from the source role tag contained in the VXLAN header of the received data packets. Further, based on a destination IP address in the received data packet, the first network device may identify the destination role tag associated with the first entity. The egress access policy at the first network device may be enforced based on the network policy.

In addition to dropping the data packets, other restriction actions may also be defined in the egress access policy. In an example, the restriction action in the egress access policy may specify that the data packets from a guest user should be re-directed to a security device. The security device may include a packet analyzer that can detect malicious behavior. In another example, a rate-limiting threshold may be defined which specifies the rate at which the subsequent data packets are permitted at the egress network device. Table-1 presented below represents an example of a network policy (e.g., the egress access policy) being enforced at the egress network devices of the WAN 104.

TABLE 1

Example egress access policy

| Source role tag | Destination role tag | Restriction Action |
|---|---|---|
| Guest | Administrator | Drop |
| Guest | Engineering | Rate-Limit |
| Guest | Finance | Re-direct |

In particular, the egress network device may enforce the egress access policy by performing the restriction action based on a match between the source role tag of a sender client device and a destination role tag of a destination client device for received data packets. For example, the egress access policy when enforced, at the first network device, may drop the data packets received from the second entity having the source role tag as 'guest' and directed to the first entity with the destination role tag as 'administrator' based on the restriction action (see Table-1) defined the egress access policy.

Further, at block 308, the first network device may perform a check to determine whether the number of data packets that have been dropped is greater than a pre-defined threshold. In an alternate implementation, the first network device may perform a check to determine whether the rate at which the data packets are being dropped is greater than a pre-defined threshold rate. At block 308, when it is determined that the number of data packets that are being dropped is less than the pre-defined threshold, the subsequent data packets received from the second entity are dropped.

At block 308, when it is determined that the number of data packets that are being dropped is greater than the pre-defined threshold, the first network device, at block 310, may communicate a command instructing a second network device for creating a restriction on the transmission of subsequent packets being directed towards the first entity 106 from the second entity. The second network device may be similar to the second network device 114 as described in FIG. 1.

In some examples, the command transmitted by the first network device may include a rule. The rule present in the command may be based on the network policy defined by an authentication and policy server. In some examples, the rule may be generated by the first network device corresponding to the second entity. The rule is used by a second network device for defining the ingress network policy.

In an example, the command is a BGP FlowSpec route that may include a rule for defining the ingress access policy at the second network device. The rule in the command is associated with a match between the source role tag and the destination role tag and a corresponding restriction action for the match. The rule contained in the BGP FlowSpec route may also be referred to as a BGP FlowSpec rule. In some examples, the BGP FlowSpec rule may specify the restriction action to be performed by the ingress network device while enforcing the ingress access policy. For example, the BGP FlowSpec rule may include the restriction action to be performed by the second network device when a subsequent data packet directed to the first entity is received at the second network device from the second entity. Table-2 presented below represents example BGP FlowSpec routes transmitted by the egress network device (e.g., the first network device) in the command sent to the ingress network device (e.g., the second network device). Each BGP FlowSpec route includes a BGP FlowSpec rule.

TABLE 2

Example BGP FlowSpec Routes

| Rules | Command/BGP FlowSpec route |
|---|---|
| 1 | Rule 1 = {Match = [SRC IP = (second entity) "guest" & DST IP = (first entity) "Administrator"], restriction action = [drop]} |
| 2 | Rule 2 = {Match = [SRC IP = (second entity) "guest" & DST IP = (first entity) "Engineering"], restriction action = [rate-limit]} |
| 3 | Rule 3 = {Match = [SRC IP = (second entity) "guest" & DST IP = (third entity) "Finance"], restriction action = [re-direct]} |

The BGP FlowSpec rule determines if there is a match between a specific source IP address and a destination IP address and an action to be performed based on the match. In an example, the BGP FlowSpec rule is defined by the egress network device based on the dropping of packets. In another example, the BGP FlowSpec rule may be defined by the authentication and policy server based on a match between a source role tag of the source entity transmitting the data packets and a destination role tag of a destination entity receiving the data packets. The BGP FlowSpec rule is transmitted in a BGP FlowSpec route by the egress network device. In an example, the BGP FlowSpec rule may be sent in the BGP FlowSpec route to the second network device that is receiving the data packets from the second entity.

Each BGP FlowSpec rule shown in Table-2 may be enforced as an ingress access policy when there is a match between a source IP address (for example, IP address of the second entity) and a destination IP address (for example, the IP address of the first entity) and a corresponding restriction action may be performed. As per BGP FlowSpec rule 1, communication may be forbidden between the source IP address of the second entity (associated with the "guest" role) and the destination IP address of the first entity (associated with the "administrator" role). The network device implementing the BGP FlowSpec rule 1 may drop the data packets received from the second entity directed towards the first entity. Similarly, as per BGP FlowSpec rule 2, data packets received from the second entity (associated with the "guest" role) and directed towards the first entity (associated with the "Engineering" role) may be rate-limited. The network device implementing the BGP FlowSpec rule 2 rate-limits the data packets being received from the second entity that is directed towards the first entity Similarly, as per BGP FlowSpec rule 3, data packets received from the second entity (associated with the "guest" role" and directed towards the first entity (associated with "Finance" role) may be re-directed to a security device, for example. In certain examples, the first network device 112 may also transmit the BGP FlowSpec route to other network devices in the network environment 100 that includes connected entities associated with the source role tag of the second entity 108. Accordingly, the other network devices may also define the respective ingress access policies by programming an ACL. The ACL may be programmed when the second entity is connected to the other network devices and the second entity is transmitting data packets towards the first entity 106.

In certain cases, the BGP FlowSpec route received by the second network device (and other network devices) may only be contained in the routing information base (not shown) of the ingress network device for a certain period of time. For example, any changes at the egress network device or the first entity may require a change in the ingress access policy at the second network device.

Figure 4:
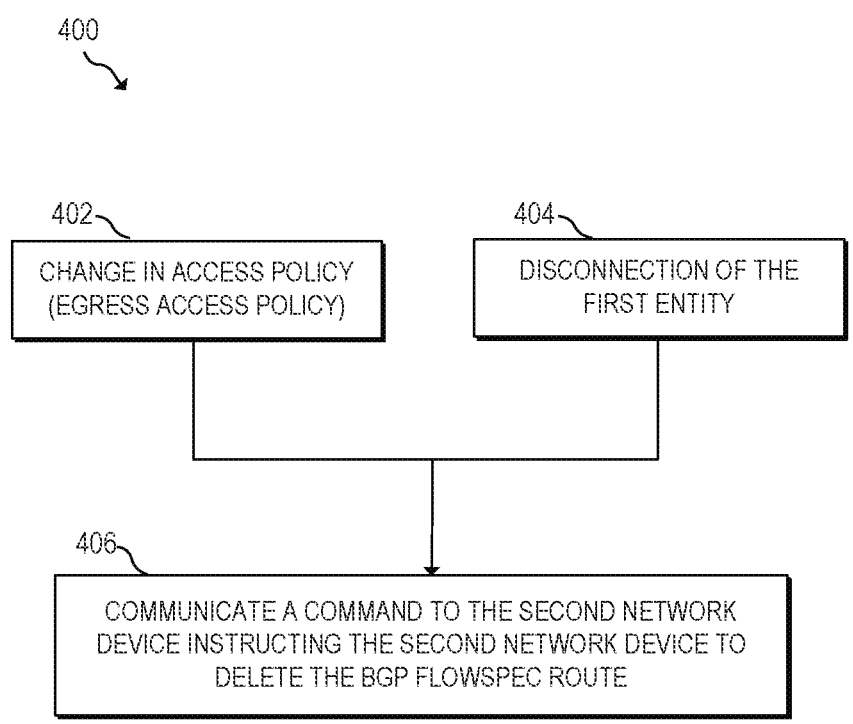
FIG. 4, a flow diagram of a method for managing a (Border Gateway Protocol) BGP FlowSpec route generated by the egress network device, in accordance with an example.

Moving to FIG. 4, a flow diagram of method 400 for managing a BGP FlowSpec route generated by an egress network device is described, in accordance with an example. The method 400 as shown in FIG. 4 may be implemented in the form of executable instructions stored on a machine-readable medium and executed by a processing resource at the first network device. For illustration purposes, the method 400 is described in conjunction with FIG. 1. The first network device and the second network device described in FIG. 4 are similar to the first network device 112 and the second network device 114 as described in FIG. 1. Similarly, the first entity and the second entity described in FIG. 4 may be similar to the first entity 106 and the second entity 108 described above in reference to FIG. 1.

In an example, at block 402, a check may be performed by the first network device to determine if there is a change in the access policy (i.e., the egress access policy) between a source role tag and a destination role tag. At block 402, if it is determined that there is no change in the access policy, the first network device may continue to check for any changes in the egress access policy. However, at block 404, if it is determined that the access policy has changed, operation at block 406 (described later) may be performed by the first network device.

Further, in some examples, at block 404, the first network device may also perform another check to determine if the first entity is disconnected from the first network device. At block 404, if it is determined that the first entity is not disconnected from the first network device, the first network device may continue to check for the connection status of the first entity with the first network device by checking Media Access Layer (MAC) aging of connected entities. However, at block 404, if it is determined that the first entity is disconnected from the first network device, operation at block 406 (described later) may be performed by the first network device. At block 406, the first network device 112 may transmit instructions to the second network device to delete the BGP FlowSpec route associated with the first entity. In some cases, with the change in the egress access policy, a new BGP FlowSpec route with a new restriction action may be transmitted to the second network device by the first network device.

Figure 5:
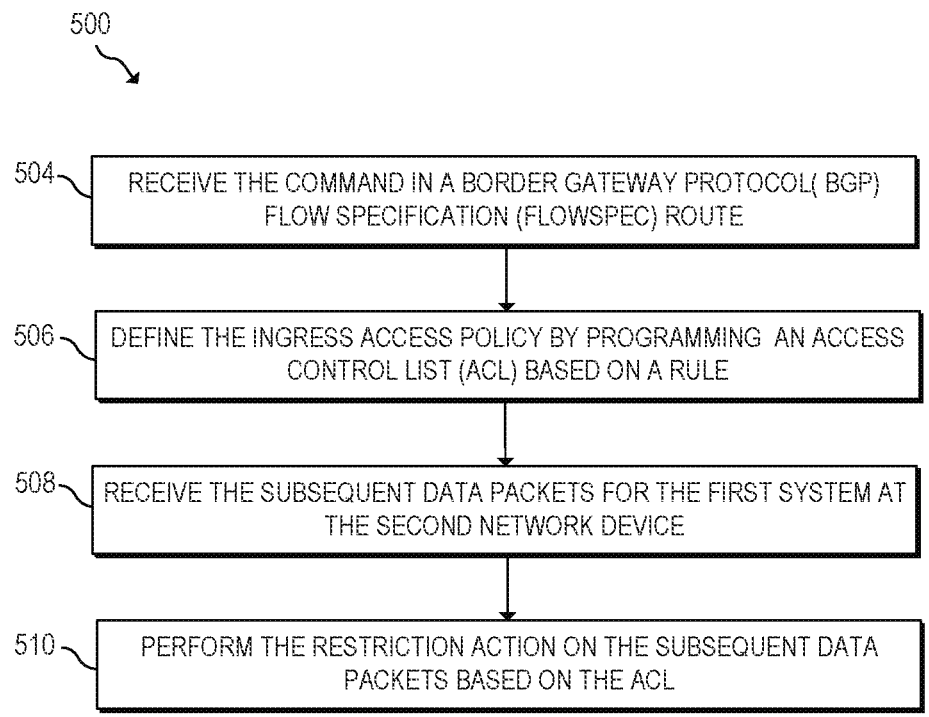
FIG. 5 is a flow diagram of a method for defining an ingress access policy by an ingress network device, in accordance with an example.

After receiving the command from the first network device, the second network device may define an ingress access policy. Referring now to FIG. 5, a flow diagram of a method 500 for defining the ingress access policy at an ingress network device, e.g., a second network device, in accordance with an example.

In some implementations, the method 500 may include more or fewer blocks than the ones shown in FIG. 5. In some implementations, one or more of the blocks of a method 500 may, at certain times, be ongoing and/or may repeat. In some implementations, blocks of the method 500 may be combined. The method 500 as shown in FIG. 5 may be implemented in the form of executable instructions stored on a machine-readable medium and executed by a processing resource (e.g. such as processor) and/or in the form of electronic circuitry at the second network device. For illustration purposes, the method 500 is described in conjunction with FIG. 1. The second network device described in FIG. 5 is similar to the second network device 114 described in FIG. 1. Similarly, the first entity and the second entity described in FIG. 5 may be similar to the first entity 106 and the second entity 108 described above in reference to FIG. 1.

At block 504, the second network device 114 may receive the command from the first network device 112 instructing the second network device 114 to create a restriction on the transmission of subsequent data packets originating from the second entity that is directed towards the first entity. As previously described in FIG. 3, the command includes a rule that defines one or more restriction actions to be performed by the second network device.

Further, at block 506, the second network device may define the ingress access policy by programming an ACL based on the rule received in the command. In an example, the ACL may be programmed based on the BGP FlowSpec rule in the BGP FlowSpec route. The ingress access policy is enforced by the second network device using the ACL.

The ACL may be used for defining a network policy for filtering traffic received at the second network device for the first entity. For example, the second network device may program the ACL based on a match between the source role tag of the second entity and the destination role tag of the first entity and the restriction action associated with the match. Once the ACL is programmed, the second network device may control the incoming or outgoing traffic from the second network device. In an example, the second network device may create the restriction on the transmission of the subsequent data packets originating from the second entity and directed towards the first entity by programming the ACL according to a BGP FlowSpec rule in the BGP FlowSpec route.

Table-3 presented below represents an example of a network policy (e.g., the egress access policy) being enforced at the ingress network devices of the WAN 104.

TABLE 3

| Example ingress access policy | | |
| --- | --- | --- |
| Source role tag | Destination role tag | Restriction Action |
| Guest | Administrator | Drop |

In particular, the ingress access policy may define a restriction action to be enforced based on a source role tag of a sender client device and a destination role tag of a destination client device. At the second network device, the data packets received from the second entity having the source role tag as 'guest' and directed to the first entity with the destination role tag as 'administrator' may be dropped. The data packets may be based on the restriction action (see Table-3) defined in the ingress access policy. Although Table-3 shows a single ingress access policy, it should be understood that the network device may maintain ingress access policies received from multiple egress network devices.

At block 508, the second network device receives subsequent data packets directed to the first entity from the second entity, the ingress access policy is enforced at the second network device. As per the ingress access policy described hereinabove, a restriction action (as discussed in the rules presented in Table-3) may be performed by the second network device (at block 510) based on the programmed ingress access policy. For example, the subsequent data packets from the second entity 108 may be dropped by the second network device 114 on enforcing the ingress access policy.

Figure 6:
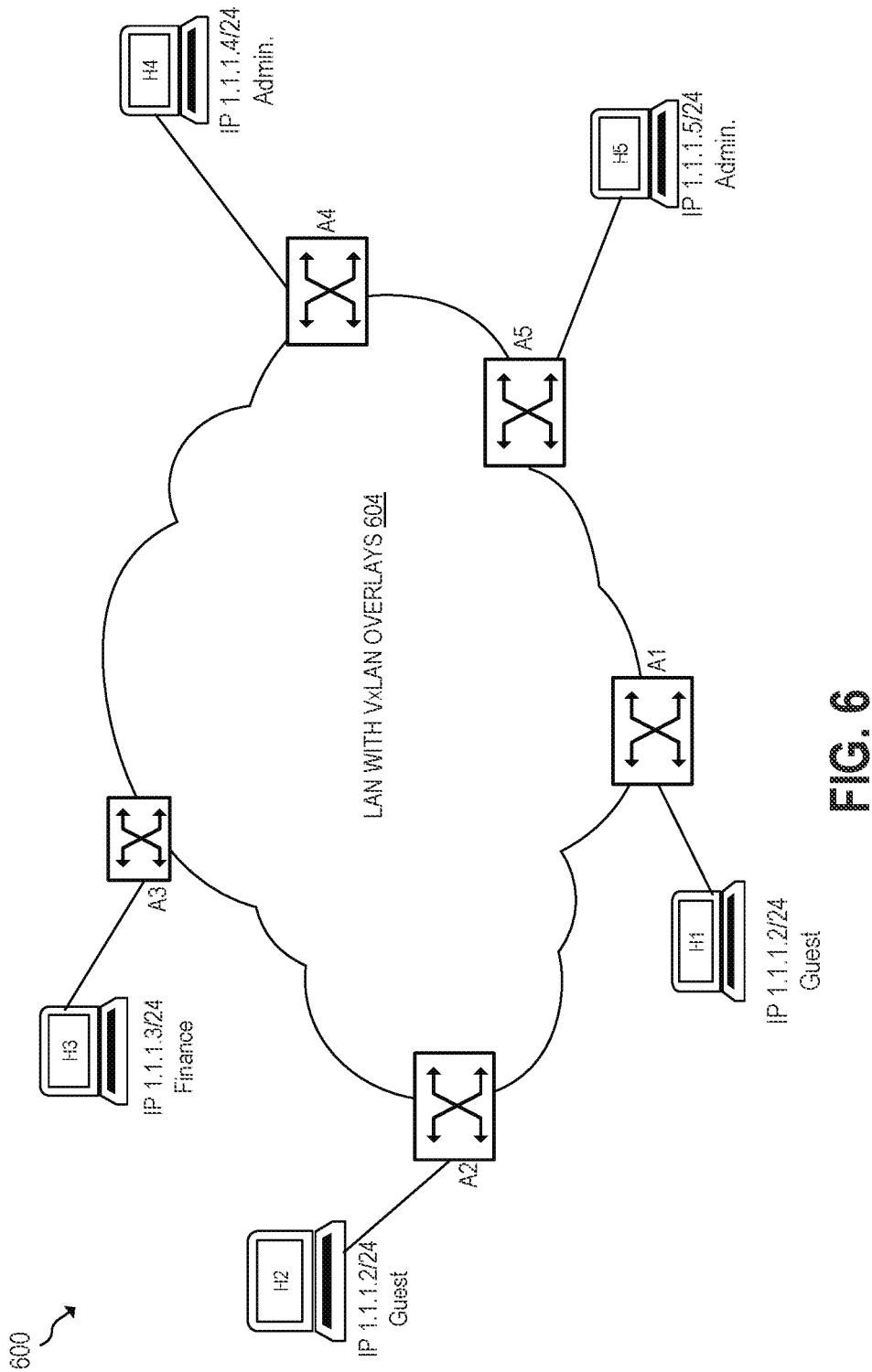
FIG. 6 is a network environment illustrating multiple client devices with different role tags communicating over a Local Area Network (LAN) using a Virtual Extensible Local Area Network (VXLAN) overlay, in accordance with an example.

FIG. 6 is an example network 600 illustrating multiple client devices with different roles communicating over a LAN using a VXLAN overlay 604, in accordance with an example. The client device's H1, H2, H3, H4, and H5 depicted in FIG. 6 may be representative of an example of one of the connected entities 106-110 described in FIG. 1. Similarly, the network switches A1, A2, A3, A4, and A5 as depicted in FIG. 6 may be representative of an example of the first network device 112 or the second network device 114 described in FIG. 1. The network switches A1, A2, A3, A4, and A5 may collectively be referred to as network switches A1-A5. The client devices H1, H2, H3, H4, and H5 may be connected to network switches A1, A2, A3, A4, and A5, respectively, over LAN and may communicate using a VXLAN overlay 604. The VXLAN overlay 604 may be representative of one of the VXLAN overlay 122 or the VXLAN overlay 124 described in FIG. 1.

The client devices H1, H2, H3, H4, and H5 may be associated with different roles and are hereinafter collectively referred to as connected client devices H1-H5. An authentication and policy server (not shown) may classify the connected client devices H1-H5 into respective SGT based on the identity credentials of the client devices H1-H5 or roles of users of the connected client devices H1-H5. Each of the connected client devices (H1-H5) may be associated with a specific SGT. For example, the client devices H1 and H2 may be used by guest users and assigned a "guest" role. Accordingly, each data packet transmitted from the client device H1 may include "guest" as the source role tag in the VXLAN header. The client devices H4 and H5 may be associated with an administrator role and the client device H3 may be associated with a finance role. In an example, the client device H5 may host a service on a User Datagram Protocol (UDP) port. As per network policy (i.e., an ingress access policy), the client device H3 (associated with finance role) may access a service provided by the client device H5. The client devices H1 and H2 (associated with guest role) may be restricted from availing of the service provided by the client device H5.

In another example, the client device H1 may transmit data packets towards the client device H5. At the network switch A5 (i.e., an egress network device), on receiving the data packets from the client device H1, an egress access policy may be enforced resulting in the dropping of the data packets received from the client device H1. The egress access policy may prohibit client devices tagged with the "administrator" role from receiving data packets from client devices associated with the "guest" role. When a certain number of data packets have been dropped, the network switch A5 may decide to communicate a command in a BGP FlowSpec route to the network switch A1 (i.e., an ingress network device) to restrict the transmission of subsequent data packets from the client device H1 to the client device H5.

Additionally, in some examples, the BGP FlowSpec route may be transmitted to other network switches that have client devices associated with guest roles to restrict the transmission of data packets from the client devices associated with guest roles towards the client device H5. For example, the BGP FlowSpec route may be transmitted by the network switch A5 to the network switches A1 and A2 that have guest client devices (e.g., the client devices H1 and H2). The network switches A1 and A2 may receive the BGP FlowSpec route from the network switch A5. The BGP FlowSpec route may include the rule indicating that that the data packets received from source IP Address (1.1.1.1/32) of the client device H1 associated with the guest role and destined to IP address (1.1.1.5/32) of client H5 associated with administrator should be dropped at the ingress network device. The network switch A1 can enforce the ingress access policy by programming an ACL based on a rule present in the BGP FlowSpec route. Accordingly, any subsequent data packets from the client device H1 received at network switch A1 may be dropped by the network switch A1.

In some cases, the BGP FlowSpec route may be transmitted to all the network switches A1-A4 in network environment 600. In some examples, the network switches A1-A5 may receive the BGP FlowSpec route and perform an action. The action performed by each network device receiving the BGP FlowSpec route may be different. The network switches A3 and A4 may discard the BGP FlowSpec route as they do not have client devices associated with the guest role. When the network switch A1 receives the BGP FlowSpec route, the network switch A1 may import the BGP FlowSpec route into its data-plane immediately as it has a client device H1 (with IP address 1.1.1.1 and associated with guest role) locally connected to it and maybe transmitting data packets to the client device H5. The network switch A1 can enforce the ingress access policy by programming an ACL according to the rule in the received BGP FlowSpec route. Any subsequent data packets from the client device H1 may be dropped at the network switch A1 by enforcing the ingress access policy at the network switch A1.

In some examples, the network switch A2 receives the BGP FlowSpec route as it has a client device H2 (with IP 1.1.1.2 and associated with guest role) locally connected to it. The network switch A2 may store and maintain this BGP FlowSpec route in its routing table. When the client device H1 moves from the network switch A1 and connects to the network switch A2, the network switch A2 may import the BGP FlowSpec route into its data plane and enforce the ingress access policy at the network switch A2. In another case, when network switch A5 receives data packets from the client device H2 directed to the client device H5, the network switch A5 may transmit a new BGP FlowSpec route (with source IP address as 1.1.1.2 of client device H2 to the network switch A2) to the network switch A2. The new BGP FlowSpec route may be specific for the client device H2.

In an alternate implementation, the network switch A2 may proactively import the BGP FlowSpec route into its data plane. The network switch A1 may program the ACL based on the BGP FlowSpec rule. This may be done with anticipation that client device H2 may send data packets to the client device H5.

Figure 7:
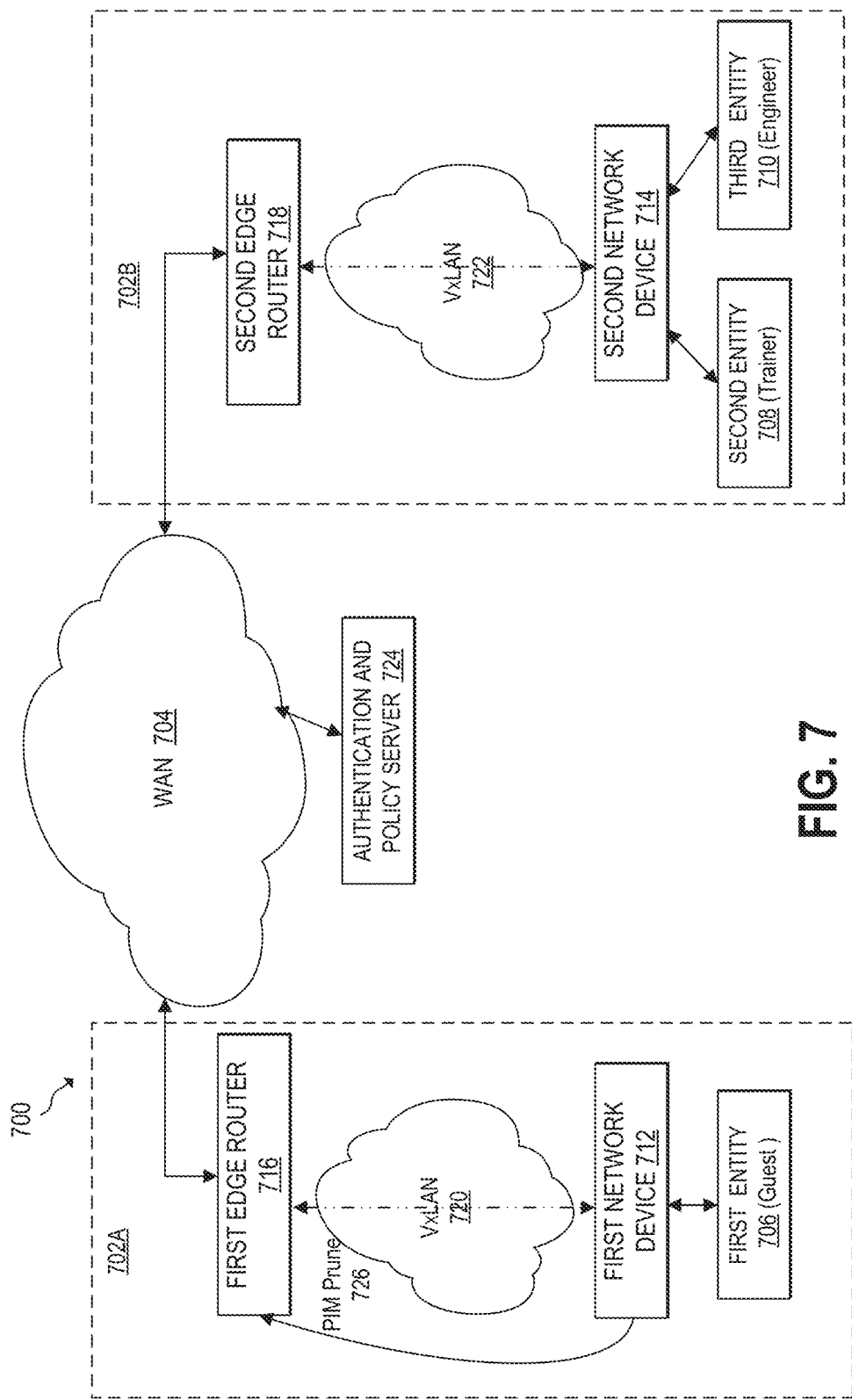
FIG. 7 illustrates a network environment in which multicast data packets from a multicast source is being transmitted towards receivers in a network, in accordance with an example.

FIGS. 1-6 describes unicast communication in the network environment 100. The data packets from the sender device are transmitted to a single destination device. The egress network policy and the BGP FlowSpec route discussed above are for restricting the transmission of data packets to a specific destination device based on the network policy. Similar BGP FlowSpec routes may not work in the case of multicast data packets where a source client device acting as a multicast source may transmit multicast data packets (e.g., a multicast stream) to multiple destination client devices (also referred to as receivers). FIG. 7 illustrates a network environment 700 in which multicast data packets from a multicast source are being transmitted towards receivers, in accordance with an example. The topology of the network environment 700 and devices in the network environment 700 may be similar to the network environment 100 described in FIG. 1 except that the network environment 700 may be configured to support the transmission of multicast traffic between connected entities. The network environment 700 may represent a distributed network in which a pair of geographically separated sites, for example, sites 702A and 702B, may communicate with each other over a WAN 704.

The sites 702A and 702B may represent one or more campus networks, branch offices, or home offices. In some examples, at each of the sites 702A and 702B there may multiple entities (sometimes also referred to as hosts, or clients, or client devices) connected to network devices. For example, the first site 702A may include a first network device 712, a first edge router 716, and a first entity 706. Further, in some examples, the second site 702B may include a second network device 714, a second edge router 718, and a second entity 708, and a third entity 710. The first entity 706 may be connected to the first network device 712, and the second entity 708, and third entity 710 may be connected to the second network device 714. The first entity 706, the second entity 708, and the third entity 710 are hereinafter collectively referred to as connected entities 706-710. The first entity 706, the second entity 708, and the third entity 710 may be representative of the first entity 106, the second entity 108, and the third entity 110 respectively. Similarly, the first network device 712 and second network device 714 may be representative of the first network device 112 or the second network device 114 respectively.

The first edge router 716 and the second edge router 718 may operate at the edges of the sites 702A and 702B and provide secure data plane connectivity between the sites 702A and 702B over a WAN 704. The network connectivity and separation between the network devices and edge routers may be provided with the VXLAN overlay (shown as 720 and 722) together with BGP as the routing protocol. In some examples, the network devices 712, 714, and the edge routers 716, 718 may be BGP speakers that may communicate and exchange routing data. The VXLAN overlay 720 and 722 may be representative of VXLAN overlay 122 and VXLAN overlay 124.

The network devices (e.g., the first network device 712 and second network device 714) and the edge routers (e.g., the first edge router 716 and second edge router 718) may transmit PIM messages to establish paths for transmission of multicast traffic over the VXLAN overlays 720 and 722. The PIM messages are used for establishing a path between the multicast source and the receivers. In FIG. 7, the second entity 708 is described as being a multicast source. The first entity 706 and the third entity 710 may be the receivers of the multicast traffic originating from the second entity 708. The PIM join messages are transmitted to the second entity 708 via the edge routers 716 and 718. The first network device 712 and second network device 714 may exchange PIM messages with respective first edge router 716 and the second edge router 718. The PIM messages are forwarded to the second entity 708 that establishes a multicast distribution tree from the second entity 708 to the first entity 706 and the third entity 710.

In an example, the second entity 708 may belong to a user who is assigned a "trainer" role. The second entity 708 may be transmitting a multicast stream. The first entity 706 and the third entity 710 may request for joining a multicast group associated with the multicast stream using Internet Group Management Protocol (IGMP) join messages to the first network device 712 and the second network device 714 respectively. The PIM join messages from the first entity 706, and the third entity 710 is forwarded to the second entity 708. The second entity 708 P may use the PIM messages for establishing a multicast distribution tree from the second entity 708 to the first entity 706 and the third entity 710.

The connected entities 706-710 may be authenticated by the authentication and policy server 724 and classified into an SGT according to the roles of the users of the connected entities. For example, the second entity 708 transmitting multicast stream may belong to the trainer and the multicast data packets may include a source role tag as "trainer". The first entity 706 interested in receiving the multicast stream may belong to a guest user and the destination role tag associated with the first entity 706 maybe "guest". The third entity 710 interested in the multicast stream may belong to a user of an engineering department and the destination role tag associated with the third entity 710 may be "Engineering". The first network device 712 and the second network device 714 receiving the multicast data packets may be referred to as egress network devices. The egress network devices enforce the egress access policy based on a network policy defined by authentication and policy server 724. The egress access policy comprises a restriction action to be performed by the egress network device while enforcing the egress access policy.

As per an example of egress access policy at the first network device 712, traffic may be forbidden between an entity associated with a guest role and other entities associated. When a PIM join request is received from the first network device 712, the second network device 714 may not be aware of the role associated with the first entity 706. When the multicast stream is initiated at the second entity 708 and the multicast data packets reach the first network device 712, the first network device 712 identifies a source role tag (i.e., guest role) associated with the second entity 708. Based on a destination IP address, the first network device 712 may identify the destination role tag of the first entity 706. As the source role tag of the second entity 708 is "trainer" and the destination role tag of the first entity 706 is "guest", the multicast data packets received from the second entity 708 and directed towards the first entity 706 are dropped by the first network device 712. The dropping of the multicast data packets at the first network device 712 results in the usage of computing resources at network devices forwarding the multicast data packets over the WAN 704. Additionally, considering the high cost of data transmission in distributed networks, the transmission of multicast data packets that are dropped leads to additional bandwidth consumption.

Figure 8:
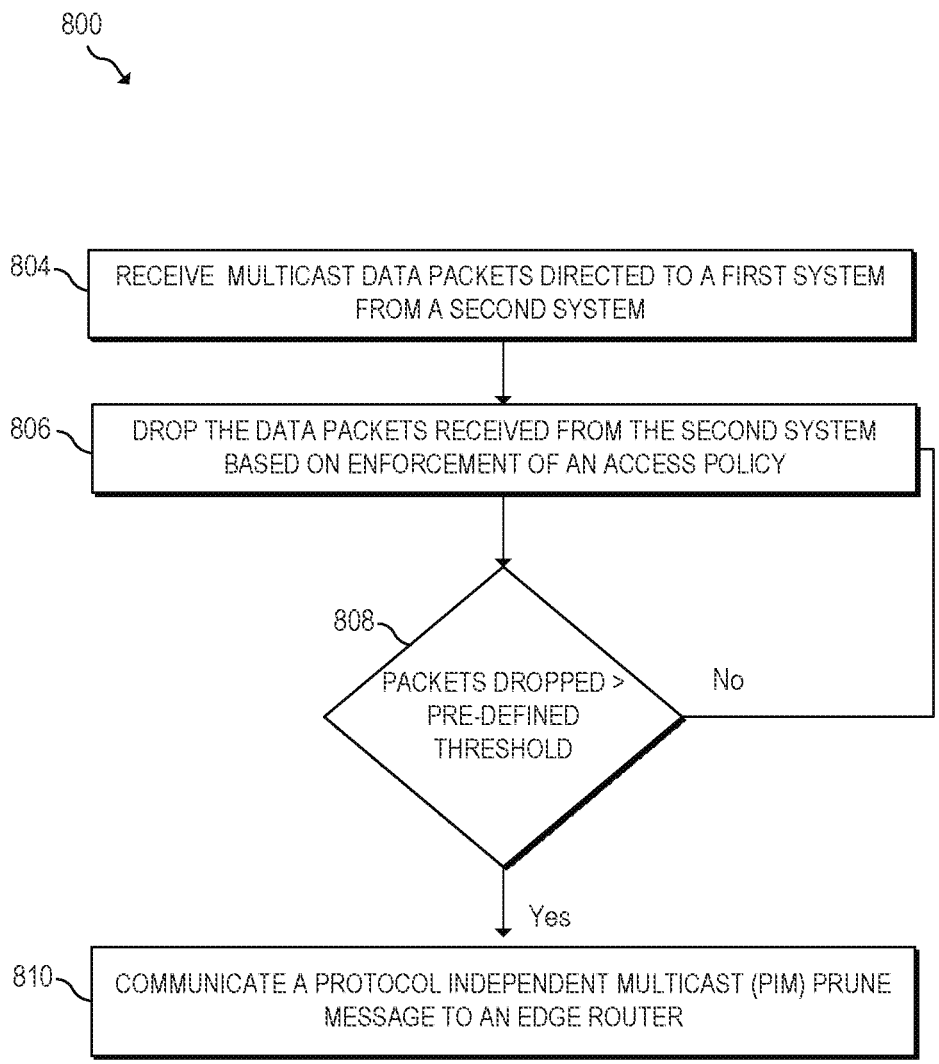
FIG. 8 is a flow diagram of a method for processing multicast data packets received at an egress network device, in accordance with an example.

The processing of the multicast data packets transmitted by the second entity 708 at the egress network device (i.e., the first network device 712) is described in FIG. 8. Referring now to FIG. 8, a flow diagram of a method 800 for processing multicast data packets received at an egress network device is described, in accordance with an example. In some implementations, the method 800 may include more or fewer blocks than are shown. In some implementations, one or more of the blocks of a method 800 may, at certain times, be ongoing and/or may repeat. In some implementations, blocks of the method 800 may be combined. The method 800 shown in FIG. 8 may be implemented in the form of executable instructions stored on a machine-readable medium and executed by processing resource (e.g. such as a processor) and/or in the form of electronic circuitry at the egress network devices receiving multicast data packets for the receivers of FIG. 7. The blocks of method 800 are described in conjunction with FIG. 7. In the example discussed in FIG. 7, the first network device 712 and the second network device 714 may be the egress network devices receiving the multicast data packets from the second entity 708 for the first entity 706 and the third entity 710, respectively.

At block 804, the first network device 712 may receive data packets directed to the first entity 706 from the second entity 708. In some examples, each multicast data packet transmitted by the second entity 708 may be tagged with a source role tag "trainer" corresponding to a role of the second entity 708 transmitting the multicast data packets.

At block 806, the first network device 712 may drop the received multicast data packets based on enforcement of an egress access policy between the source role tag associated with the second entity 708 and a destination role tag associated with the first entity 706. The egress access policy may be defined based on the role of the connected entity transmitting multicast data packets and the role of the connected entity receiving the multicast data packets. At the egress network devices, the network policies defined by an authentication and policy server 724 are implemented as an egress access policy based on multicast data packets received and the roles associated with the second entity 708, the first entity 706, and the third entity 710. As the source role tag of the second entity 708 is "trainer" and the destination role tag of the first entity 706 is "guest", data packets received from the second entity 708 and directed towards the first entity 706 are dropped by the first network device 712.

The first network device 712 may continue dropping the multicast data packets until a pre-defined threshold is reached. The pre-defined threshold may be a specific number of multicast data packets that are dropped or a rate at which the multicast data packets are dropped. At block 808, the first network device 712 determines if the number of multicast data packets that are dropped is greater than the pre-defined threshold. At block 808, if it is determined by the first network device that the number of the multicast data packets that are dropped is less than the pre-defined threshold, the first network device may continue dropping the multicast data packets. If the number of multicast data packets received and dropped is low, they can be ignored.

At block 808, if it is determined by the first network device 712 that the number of multicast data packets that are dropped is greater than the pre-defined threshold, the first network device 712 may communicate (at block 810) a PIM prune message 726 to the first edge router 716. At the first edge router 716, the path between the first edge router 716 and the first network device 712 is pruned. The pruning of the path prevents forwarding of the multicast data packets first edge router 716 to the first network device 712. The pre-defined threshold may be selectively chosen such that a balance between a signaling overhead needed for transmitting the PIM prune message and the multicast data packet propagation overhead may be maintained. For example, at high pre-defined thresholds, the egress network device (i.e., the first network device 712) may drop multiple multicast data packets before initiating signaling. For example, the PIM prune message may be sent by the first edge router 716 after dropping several multicast data packets.

Figure 9:
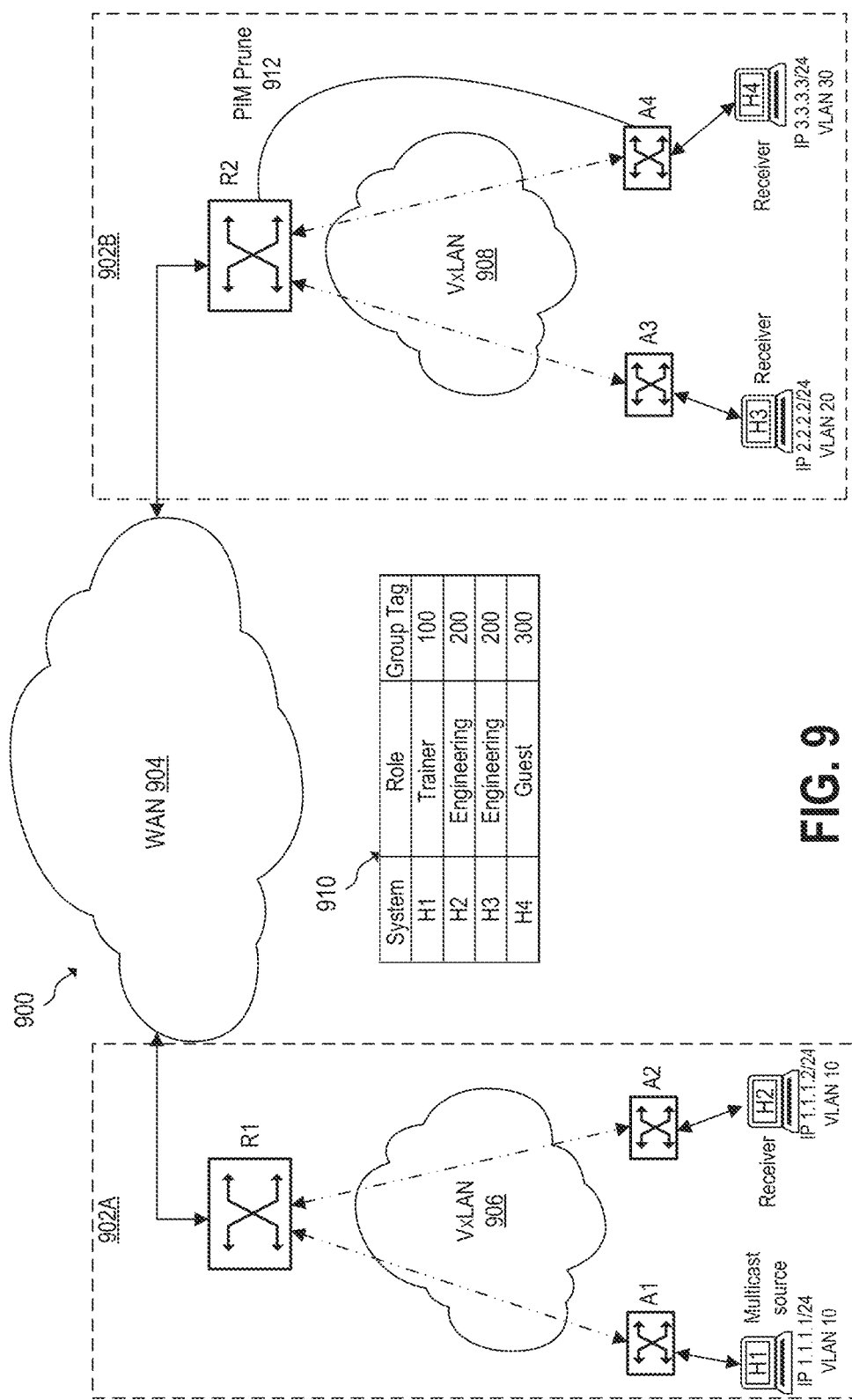
FIG. 9 is a network environment illustrating a multicast source transmitting a multicast stream to multiple client devices associated with different roles, in accordance with an example.

FIG. 9 is a network environment 900 illustrating a multicast source transmitting a multicast stream to multiple client devices associated with different roles, in accordance with an example. FIG. 9 shows a network environment 900 in which two different geographically separate sites 902A and 902B are connected over a WAN 904. The topology of the network environment 900 and the client devices in the network environment 900 may be similar to the network environment 700 described in FIG. 7. The network environment 900 may represent a distributed network in which a pair of geographically separated sites, for example, sites 902A and 902B, are connected over a WAN 904.

The sites 902A and 902B may represent one or more of campus networks, branch offices, or home offices. For example, a first site 902A may include network switches A1 and A2, and client devices H1 and H2. Further, in some examples, the second site 902B may include network switches A3 and A4, and client devices H3 and H4. The client devices H1, H2, H3, and H4, depicted in FIG. 9 may be representative of one of the connected entities 106-110 as described in FIG. 1. The client devices H1, H2, H3, and H4 are hereinafter collectively referred to as client devices (H1-H4). Similarly, the network switches A1, A2, A3, and A4 depicted in FIG. 9 may be representative of one of a first network device 112 or a second network device 114 as described in FIG. 1. The network switches A1, A2, A3, and A4 are hereinafter collectively referred to as network switches A1-A4. Additionally, the network device A1-A4 may be configured to support multicast communication.

The network connectivity and separation between the network devices and edge routers may be provided with the multicast VXLAN overlay (shown as 906 and 908) together with BGP as the routing protocol. In some examples, the access switches A1-A4 and the edge routers R1 and R2 may be BGP speakers that may communicate and exchange routing data. The VXLAN overlay 906 and the VXLAN overlay 908 may be representative of the VXLAN overlay 122 and the VXLAN overlay 124 respectively. Edge routers R1 and R2 may operate at the edges of sites 902A and 902B and provide secure data plane connectivity between the sites 902A and 902B over the WAN 904. The edge router R1 and the edge router R2 may be representative of the first edge router 116 and the second edge router 118 respectively. The edge routers R1 and R2 and network switch A1-A4, run the PIM to establish multicast distribution trees over multicast VXLAN overlays 906 and 908.

When the client devices H1-H4 are authenticated to the network environment 900, they may be grouped to specific SGT based on the role of the users. Each of the client devices H1-H4 may be associated with different roles. An authentication and policy server (not shown) may classify the client devices H1-H4 into respective SGT based on the identity credentials of the entity or user roles. Table 910 shows the role associated with each client device in the network environment 900 and an SGT-based group tag. For example, the client device H1 may be used by a trainer and assigned a trainer role. Each multicast data packet transmitted from the client device H1 may include "trainer" as the source role and a group tag "100" may be transmitted as the source role tag in the VXLAN header. In another example, client device H4 may include "guest" as and assigned with a group tag "300", and client devices H2 and H3 may be associated with an engineering role and assigned with a group tag "200".

The client device H1 associated with the trainer role may transmit a multicast stream. The client device H1 connects to the network switch A1 and transmits the multicast data packets with a source role tag "100". The client devices (also referred to as receivers) H2, H3, and H4 may transmit IGMP join messages to respective switches A2, A3, and A4 for joining a multicast group associated with the multicast stream of the trainer. The client devices H2, H3, and H4 are receivers of the multicast stream from the multicast source (i.e., the client device H1). The network switches A2, A3 and A4 may receive the IGMP join messages and establish multicast distribution trees with root at network switch A1 using PIM messages for receiving the multicast stream from the client device H1.

As client device H1 is not aware of the roles associated with the receivers H2, H3, and H4, it may transmit multicast data packets to all the receivers joining the multicast group. When multicast data packets transmitted by the client device H1 arrive at the network switch A4 for client device H4, the network switch A4 enforces an egress access policy and drops the multicast data packets. In one example, the egress access policy, may not permit guest users to receive data from the trainer. After dropping multicast data packets for a period, as per the egress access policy, the network switch A4 may transmit a PIM prune message (H1, G) 912 to the edge router R2. The edge router R2 prunes the path between the edge router R2 and the network switch A4. The path between the edge router R2 and network switch A4 is deleted. Subsequent multicast data packets arriving from the client device H1 at the edge router R2 are delivered only to the network switch A3 by the edge router R2 and not to the network switch A4. The client device H3 continues to receive the multicast stream from the trainer via the network switch A3.

The network switches A1-A4 may perform Internet Group Management Protocol (IGMP) snooping and generate IGMP join/leave messages. In some implementations, the edge routers R1 and R2 may run both PIM and IGMP to establish multicast distribution trees over multicast VXLAN overlays 906 and 908. The IGMP snooping allows the network switches A1-A4 to forward the IGMP join/leave messages to the edge routers R1 and R2. In a scenario, when both H3 and H4 are associated with a "guest" role, the network switches A3 and A4 may transmit the IGMP join messages to the edge router R2. The edge router R2 may transmit a PIM join message to communicate with the edge router R1 to receive the multicast data packets. On receiving the multicast data packets, the edge router may determine the source role tag of the client device H1 and destination role tag if the client devices H3 and H4. The edge router R2 may apply the egress access policy and drop the multicast data packets. The edge router R2 may identify that there are no receivers for the multicast data packets from the client device H1 based on the egress access policy. The edge router R2 may send an IGMP leave message to the edge router R1 to prevent the transmission of the multicast data packets from site 902A to site 902B. The path between the edge route R1 and the edge router R2 is deleted.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
 receiving, by a first network device in a network, data packets directed to a first entity from a second entity, wherein the second entity is connected to a second network device in the network, and wherein each data packet includes a source role tag corresponding to the second entity;
 dropping, by the first network device, the data packets received from the second entity based on enforcement of an egress access policy between the source role tag and a destination role tag corresponding to the first entity;
 determining, by the first network device, whether a number of the data packets that are dropped is greater than a pre-defined threshold; and
 in response to determining that the number of the data packets that are dropped is greater than the pre-defined threshold, communicating, by the first network device, a command to the second network device instructing the second network device to create a restriction on transmission of subsequent data packets originating from the second entity that is directed towards the first entity,
 wherein the first network device is an egress network device and the second network device is an ingress network device.

2. The method of claim 1, wherein the command is transmitted as a Border Gateway Protocol (BGP) Flow Specification (FlowSpec) route to the second network device.

3. The method of claim 1, wherein the command comprises a rule that is used to define an ingress access policy for the restriction on transmission of subsequent data packets originating from the second entity that are directed towards the first entity.

4. The method of claim 3, wherein the rule in the command is associated with a match between the source role tag and the destination role tag and a restriction action corresponding to the match, and wherein the restriction action is performed by the second network device.

5. The method of claim 4, wherein the restriction action comprises of at least one of dropping of subsequent data packets, redirecting of the subsequent data packets, and rate-limiting threshold for the subsequent data packets.

6. The method of claim 1, wherein communicating the command comprises transmitting, by the first network device, the command to other network devices in the network that have at least one entity with the source role tag of the second entity, wherein the other network devices store the command.

7. The method of claim 6, wherein the other network devices enforce ingress access policies at respective other network devices on receiving data packets from the second entity, and wherein the second entity is connected to the other network devices and the second entity is transmitting data packets towards the first entity.

8. The method of claim 1, wherein the method further comprises:
 detecting, by the first network device, a change in an access policy between the source role tag and a destination role tag or a disconnection of the first entity from the first network device; and
 in response to detecting at least one of a change in the access policy or disconnection of the first entity,
 communicating, by the first network device, another command to the second network device instructing the second network device to delete a BGP FlowSpec route associated with the access policy of the first entity.

9. A system comprising:
 a processor;
 a memory coupled to the processor, the memory storing instructions executable by the processor to:
 receive, by a first network device in a network, data packets directed to a first entity from a second entity, wherein the second entity is connected to a second network device in a network, and wherein each data packet includes a source role tag corresponding to the second entity;
drop, by the first network device, the data packets received from the second entity based on enforcement of an egress access policy between the source role tag and a destination role tag corresponding to the first entity;
determine, by the first network device, whether a number of the data packets that are dropped is greater than a pre-defined threshold; and
in response to determining that the number of the data packets that are dropped is greater than the pre-defined threshold,
communicate, by the first network device, a command to the second network device instructing the second network device to create a restriction on transmission of subsequent data packets originating from the second entity that is directed towards the first entity.

10. The system of claim 9, wherein the first network device is an egress network device and the second network device is an ingress network device.

11. The system of claim 9, wherein the command is communicated as a Border Gateway Protocol (BGP) Flow Specification (FlowSpec) route to the second network device.

12. The system of claim 9, wherein additional instructions stored in the memory, when executed by the processor, further causes the processor to:
transmit, by the first network device, a rule in the command to the second network device, wherein the rule is used to define an ingress access policy for restriction on transmission of subsequent data packets originating from the second entity that is directed towards the first entity.

13. The system of claim 12, wherein the rule in the command is associated with a match between the source role tag and the destination role tag and a restriction action corresponding to the match, and wherein the restriction action is performed by the second network device.

14. The system of claim 13, wherein the restriction action comprises of at least one of dropping of the subsequent data packets, redirecting of the subsequent data packets, and a rate-limiting threshold for the subsequent data packets.

15. The system of claim 11, wherein additional instructions stored in the memory, when executed by the processor, further causes the processor to:
transmit the command to other network devices in the network that have a second entity connected to the other network devices, wherein the other network devices store the command.

16. The system of claim 11, wherein additional instructions stored in the memory, when executed by the processor, further causes the processor to:
detect a change in an access policy between the source role tag and a destination role tag or a disconnection of the first entity from the first network device; and
communicating, by the first network device, another command to the second network device instructing the second network device to delete a BGP FlowSpec route associated with the access policy of the first entity in response to detecting at least one of a change in the access policy or disconnection of the first entity.

17. A non-transitory machine-readable medium comprising instructions executable by a processor, the instructions comprising:
instructions to receive, at a first network device in a network, data packets directed to a first entity from a second entity, wherein the second entity is connected to a second network device in the network, and wherein each data packet includes a source role tag corresponding to the second entity;
instructions to drop, by the first network device, the data packets received from the second entity based on enforcement of an egress access policy between the source role tag and a destination role tag corresponding to the first entity;
instructions to determine, by the first network device, whether a number of the data packets that are dropped is greater than a pre-defined threshold; and
in response to determining that the number of the data packets that are dropped is greater than the pre-defined threshold,
instructions to communicate, by the first network device, a command to the second network device instructing the second network device to create a restriction on transmission of subsequent data packets originating from the second entity that is directed towards the first entity, wherein the first network device is an egress network device and the second network device is an ingress network device.

18. The non-transitory machine-readable medium of claim 17, wherein the first network device is an egress network device and the second network device is an ingress network device.

19. The non-transitory machine-readable medium of claim 17, wherein communicating the command comprises of additional instructions that are executable by the processor, the instructions comprising:
instructions to transmit, by the first network device, a Border Gateway Protocol (BGP) Flow Specification (FlowSpec) route to the second network device, wherein the BGP FlowSpec route comprises of a BGP FlowSpec rule, and wherein the BGP FlowSpec rule is associated with a match between the source role tag and the destination role tag and a corresponding restriction action for the match.

20. The non-transitory machine-readable medium of claim 19, wherein the restriction action comprises at least one of the dropping of the subsequent data packets, redirecting of the subsequent data packets, or rate-limiting threshold for the subsequent data packets.

* * * * *